July 3, 1962 J. M. BROWNLOW 3,042,618

PREPARATION OF A BISTABLE FERRITE CIRCUIT ELEMENT

Filed June 9, 1959 2 Sheets-Sheet 1

PREPARATION OF A BISTABLE FERRITE CIRCUIT ELEMENT

Filed June 9, 1959 2 Sheets-Sheet 2

INVENTOR
JAMES M. BROWNLOW

BY Alvin J. Riddles
ATTORNEY

United States Patent Office 3,042,618
Patented July 3, 1962

3,042,618

PREPARATION OF A BISTABLE FERRITE CIRCUIT ELEMENT

James M. Brownlow, Fishkill, N.Y., assignor to International Business Machines Corporation, New York, N.Y., a corporation of New York Filed June 9, 1959, Ser. No. 819,056
3 Claims. (Cl. 252—62.5)

This invention relates to high speed, bistable circuit elements and more particularly to a small, high speed ferrite computer storage and switching element.

Since the discovery that certain ferrite materials in the form of toroidally-shaped cores exhibited the characteristics required for operation as a memory material in computer circuitry, in particular, the rectangular hysteresis loop, it has been the object of considerable research to provide new and improved ferrite memory elements.

Particularly sought after are memory elements exhibiting high switching speeds. With such high-speed elements it is possible to design computers consisting of a few simple circuits which may be used over again to perform desired operations. For example, if high-speed elements were available, a serial adder could be used instead of the more complicated parallel adders now being used.

While it is known that certain thin metallic films inherently possess these high-speed characteristics, their use in application appear at present to be limited by certain operational difficulties, such as the problem of disturbed sensitivity or partial switching during half selection in the coincident-current selection scheme. It is desired, therefore, to provide memory elements for computer circuitry which combine the advantages of the presently-used ferrite elements and the high-speed thin metallic films.

What is described hereinafter is a high-speed switching element composed of ferrite material. The element may take the form of open flux path rods, bars, fibers which have remanence in the plane of the element or in the form of thin toroids with closed flux paths. These elements exhibit these characteristics within certain dimensions, particularly when the thickness of the element is below 25 microns.

The open flux path elements are particularly amenable to printed circuit wiring techniques, which is of a distinct advantage in fabrication of large-scale memory arrays for computer circuits. In addition to their unusually high speed operation, the elements of the present invention produce sharp output voltage characteristics and negligible disturbed sensitivity during half select operations, characteristics which make these elements more desirable for large-scale memory arrays than presently available memory elements.

Another characteristic of the computer circuit element of the present invention is that its hysteresis loop possesses a very high degree of squareness.

A method is described herein for preparing these elements, said method comprising mixing the ferrite powders in a predetermined ratio, calcining the mixture in air at elevated temperatures to form the spinel structure, mixing a suitable resinous binder and solvent therewith, applying the mixture to a support surface, drying, cutting into desired sizes and shapes, separating the parts from the support surface and firing the parts in a suitable boat at elevated temperatures.

Accordingly, an object of the present invention is to provide a high-speed storage and switching element.

Another object of the present invention is to provide a high-speed, open flux path ferrite memory element having very high remanence in the plane of the element.

A further object is to provide an open flux path ferrite memory element having a switching constant, $S_w$, in the order of 0.15 oersted-microsecond, said element having remanence in the plane of the element and a thickness of less than 25 microns.

Still another object of the present invention is to provide a high-speed, closed flux path ferrite memory element, such as a toroid.

Yet another object is to provide a closed flux path ferrite memory element having a switching constant, $S_w$, in the order of 0.15 oersted-microsecond, said element having a thickness of less than 25 microns.

Among the other objects of the present invention is to provide an open flux path ferrite memory element having high speed switching characteristics, and which may be selected by conventional coincident-current techniques.

A more specific object is to provide a high speed switching, low coercive force, rectangular hysteresis loop, square knee, memory element, said element taking the geometrical shape of a bar having a thickness of less than 25 microns and a length-to-width ratio of greater than 5.

Still another object of the present invention is to provide methods for preparing these ferrite elements.

Another specific object of the present invention is to provide a method by which an open flux path, square hysteresis loop ferrite memory elements may be prepared, which method comprises mixing the ferrite powder in predetermined ratios, calcining the mixture in air at elevated temperatures to form the spinel structure, mixing a resinous binder and a suitable solvent therewith applying the mixture to a support surface, drying, cutting into desired shapes and firing at elevated temperatures.

The foregoing and other objects, features and advantages of the invention will be apparent from the following more particular description of the preferred embodiments of the invention as illustrated in the accompanying drawings.

Figure 2:
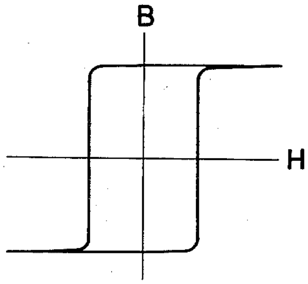
FIGURE 2 is a reproduction of an actual 60-cycle hysteresis loop obtained from these elements; the particular loop shown being obtained on body number 103 having a thickness of 25 microns given in Table I.
Figure 2B:
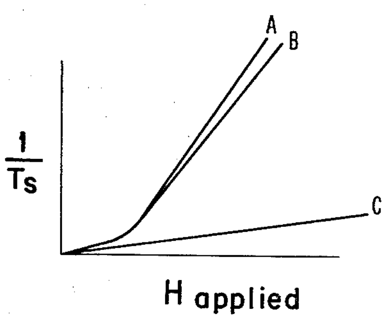
Figure 2A:
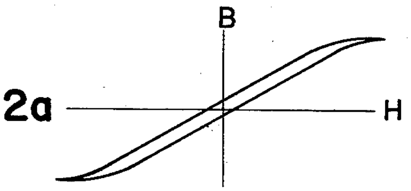

FIGURE 2*a* shows a similar loop for a body of 50 microns thickness, namely T14A shown in Table III.

FIGURE 2*b* is a switching plot of $1/T_s$ vs. $H_{\text{applied}}$ for body 103 of Table I (curve *A*), for thin toroids (B) and thick toroids (C).

Figure 3:
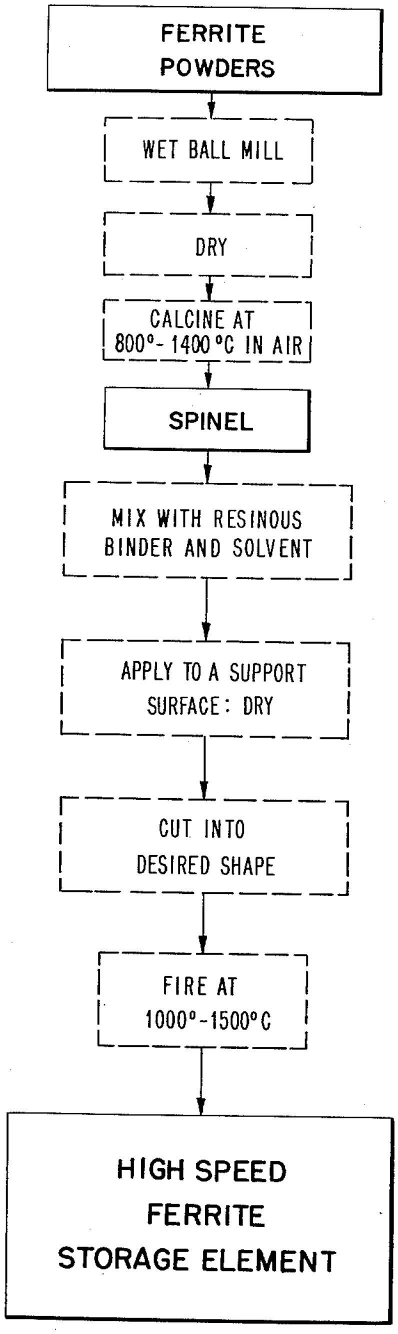

FIGURE 3 is a flow chart illustrating the process by which the elements of the present invention may be prepared.

Figure 1:
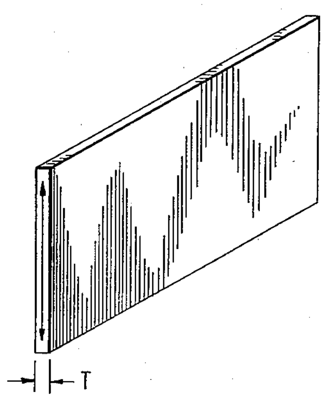
FIGURE 1(*a–f*) shows the various geometrical forms that the high-speed switching element of the present invention may assume.
Figure 1A:
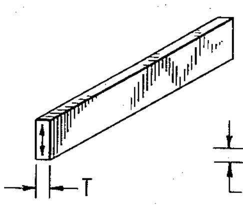
Figure 1B:
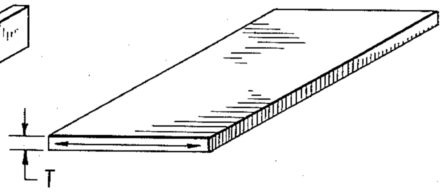
Figure 1C:
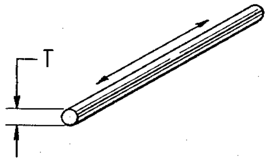
Figure 1D:
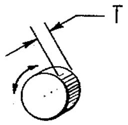
Figure 1E:
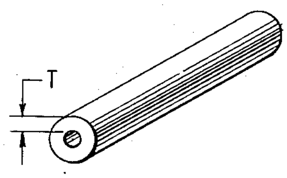
Figure 1F:
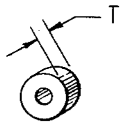

Referring now to FIGURES 1(*a–f*) there is shown in graphic representation some of the geometrical forms that the highspeed circuit element of the present invention may assume. These elements are prepared within certain specified predetermined dimensions which will be described hereinafter. Within these dimensions the elements exhibit switching constants in the order of 5 times smaller than conventional thick toroidally shaped ferrite cores presently used as memory materials in computers. In addition the elements of the present invention exhibit a higher degree of hysteresis loop rectangularity, which permits use of coincident-current selection raitos less than the presently used 2:1 ratio. As for example 4:3 may be used in coincident-current memory arrays with the present elements.

Another characteristic of the element of the present invention is that they may be made in a form which exhibits an open flux path, the remanent state of which lies substantially in the plane of the element. This magnetic behaviour results in improved pulse performance, in particular, a sharp spiked output signal. Furthermore smaller disturbed sensitivity is observed with half select pulses. The degree of non-shearing of the hysteresis loop may be optimized by proper adjustment of the geometrical dimensions of the element.

The elements described herein may be prepared by the following process:

Suitable metallic oxides, as for example, magnesium oxide, manganese sesquioxide and ferric oxide are mixed in suitable predetermined proportions in accordance with the ratios used in the conventional ferrite systems presently used as thick toroids. The mixed oxides are ball milled in water, dried and calcined in air at 800–1400° C. to form the desired spinel compound. The mass is then repulverized with a resinous binder and solvent. The binder comprises between 5 and 50% by weight of the spinel powders and the solvent between ½ and 4 times by weight of all dry materials, including resin and ferrite. The percentage of the binder and solvent is chosen such that the ferrite particles touch each other but do not agglomerate. Suitable binders and solvents, respectively, include nitrocellulose resins such as pyroxylin, and amyl acetate, alkyd resins and toluene and polyvinyl alcohol and water. The ferrite-binder-resin mixture is reball milled for 2 to 10 hours to further subdivide the mixture and poured or sprayed onto a glass or other suitable support medium on a spinning table and spun until dry. The resulting sheet or film is then cut into the desired size and shape, as for example, into thin fibers, rods, bars, or toroids. The parts are thereafter separated from the support surface prior to final sintering. A convenient way to accomplish this separation is to pretreat the glass surface with a 1–4% gelatin-water solution prior to application of the ferrite dispersion. The parts are then transferred to a firing container, such as an alumina lined platinum boat, the alumina being used to prevent sticking of the parts of the platinum, and sintered at elevated temperatures, in the range of 1000 to 1500° C., for 5 minutes to three hours, and thereafter cooled to room temperature to form the final product.

With reference to the generalized flow sheet shown in FIGURE 3 the following specific example will illustrate the process:

Magnesium oxide, 32.2 grams, manganese sesquioxide, 38.7 grams, and ferric oxide, 135.7 grams, corresponding to the formula $Mg_{0.8}Mn_{0.5}Fe_{1.7}O_4$, were intimately mixed. The mixture was wet ball milled for ten hours, oven dried at 110° C. for 2 hours and calcined in air at 1000° C. for three hours. The mass was repulverized to a fine powder and mixed with 40 grams of pyroxylin and 500 grams of amyl acetate. The thin slurry was ball milled for four hours, then poured onto a glass surface covered with a thin layer of gelatin, placed on a spinning table and spun dried. The resulting thin sheet of ferrite was then cut into bars having a length of 0.75 inch, a width of 0.12 and a thickness of 0.0004 inch. The bar ferrite elements were then separated from the support surface by dissolving out the gelatin with warm water. The individual parts were then placed in a platinum boat lined wtih alumina, sintered at 1400° C. for five minutes and slowly cooled to room temperature.

Using the general method described above a number of ferirte elements of varying compositions, sizes and shapes, as shown in Table I, were prepared.

Table II shows some pulse test data obtained for open flux path ferrite elements of the composition $$Mg_{.8}Mn_{.5}Fe_{1.7}O_4$$

Table III presented below shows the effect of varying the thickness of bar ferrite elements on loop squareness.

TABLE I

*Physical Properties of the High Speed Ferrite Element of the Present Invention*

| Body Number | Formula in Atom Numbers | Firing Conditions: Temp. (° C.) | Firing Conditions: Time (Min.) | $H_o$ (Oer.) | $B_s$ (gauss) | $B_r$ (gauss) | $B_r/B_s$ | Switching Constant $S_w$, (oer.) (μsec.) | Length L (in.) | Width W (in.) | L/W Ratio | Thickness, T (microns |
|---|---|---|---|---|---|---|---|---|---|---|---|---|
| 103 | $Mg_{.8}Mn_{.5}Fe_{1.7}O_4$ | 1,400 | 5 | 3.0 | 3,000 | 2,700 | .90 | 0.12 | 0.75 | .012 | 70 | 9.0 |
| 103A | $Mg_{.8}Mn_{.5}Fe_{1.7}O_4$ | 1,400 | 5 | 3.0 | 3,000 | 2,400 | .8 | 0.15 | 0.75 | .025 | 30 | 9.0 |
| 103B | $Mg_{.8}Mn_{.5}Fe_{1.7}O_4$ | 1,400 | 5 | 3.0 | 3,000 | 2,200 | .73 | 0.15 | 0.75 | .060 | 10 | 9.0 |
| 103C | $Mg_{.8}Mn_{.5}Fe_{1.7}O_4$ | 1,400 | 60 | 2.6 | 3,000 | 2,500 | .83 | 0.15 | 0.390 | .015 | 26.0 | 9.0 |
| 103D | $Mg_{.8}Mn_{.5}Fe_{1.7}O_4$ | 1,400 | 15 | 3.2 | 3,000 | 2,700 | .90 | 0.15 | 0.5 | .025 | 20.0 | 9.0 |
| 103E | $Mg_{.8}Mn_{.5}Fe_{1.7}O_4$ | 1,400 | 15 | 3.3 | 3,000 | 2,700 | .90 | 0.15 | 0.400 | .030 | 13.3 | 4.0 |
| 103F | $Mg_{.8}Mn_{.5}Fe_{1.7}O_4$ | 1,400 | 15 | 3.3 | 3,000 | 2,400 | .80 | 0.15 | 0.625 | .0250 | 25.0 | 4.0 |
| 103G | $Mg_{.8}Mn_{.5}Fe_{1.7}O_4$ | 1,400 | 60 | 2.6 | 3,000 | 2,700 | .90 | 0.15 | 0.500 | .020 | 25.0 | 9.0 |
| 103H | $Mg_{.8}Mn_{.5}Fe_{1.7}O_4$ | 1,350 | 1200 | 1.6 | 3,000 | 2,700 | .90 | 0.15 | 0.55 | .020 | 27.5 | 9.0 |
| K194 | $Mg_{0.2}Mn_{1.0}Zn_{0.3}O_4$ | 1,400 | 10 | 2.0 | 2,000 | 1,600 | 0.80 | 0.20 | 0.50 | .020 | 25.0 | 9.0 |
| K117 | $Mn_{1.29}Cr_{0.065}Ni_{0.065}Fe_{1.58}O_4$ | 1,400 | 20 | 3.0 | 2,500 | 1,750 | 0.75 | 0.18 | 0.50 | .020 | 25.0 | 9.0 |
| T14 | $Cu_{.04}Mn_{1.26}Fe_{1.70}O_4$ | 1,400 | 20 | 3.0 | 2,500 | 1,750 | 0.75 | 0.12 | 0.50 | .010 | 50.0 | 9.0 |
| K133 | $Mg_{9}Ni_{.28}Ti_{.2}Fe_{1.62}O_4$ | {1,400<br>{1,250 | 60 Air<br>120 $CO_2$ | 6.0 | 2,000 | 1,400 | 0.75 | ---------- | 0.50 | .020 | 25.0 | 9.0 |

TABLE II

*Pulse Data*

| Body No. | Length L (in.) | Width W (in.) | L/W | Thickness T, (microns) | Switching Time $T_{s_{3-1}}$ (msec.) | Switching Time $T_{s_{2-1}}$ (msec.) | $H_0$ (oer.) | Discrim. Ratio |
|---|---|---|---|---|---|---|---|---|
| 103I | 0.50 | 0.025 | 20.0 | 9 | 0.125 | 1.10 | 3.0 | 8 |
| 103J | 0.30 | 0.01 | 30.0 | 3 | 0.095 | 0.250 | 3.0 | 10 |

$H_0$—Threshold field=maximum field for which no irreversible switching occurs.

$T_{s_{3-1}}$—Switching time for applied field of $3H_0$. Measured as the duration of the output voltage pulse between 10— amplitude points when the element is driven by square pulses.

$T_{s_{2-1}}$—Switching time for applide field of $2H_0$. Measured in the same way.

Discrimination Ratio is defined as the ratio or voltage output obtained when the element is read out from the undisturbed "1" remanence state to the voltage output obtained when a positive half select pulse is applied to the element in the disturbed "0" remanence state

TABLE III

*Effect of Varying the Thickness of Bar Ferrite Elements on Loop Squareness*

| Body No. | Length | Width | T microns | Degree of Shearing of Loop |
|---|---|---|---|---|
| T14A | 0.2 | 0.03 | 50 | Severely sheared (Figure 2*a*). |
| 103L | 0.3 | 0.03 | 30 | Sheared. |
| 103M | 0.2 | 0.03 | 16 | No shearing (Similar to Fig. 2). |

As shown in the tables the ferrite element of the present invention exhibits exceedingly fast switching characteristics as well as a high degree of loop squareness. The data in Table II in particular indicates the suitability of the element for operation in coincident-current memory arrays. For this application as shown by the $B_r/B_s$ ratio of bodies 103, 103A and 103B of varying $L/W$ ratios presented in Table I, it is desirable that the $L/W$ ratio be greater than 5 and the thickness be kept below 10 microns. Table III shows the effect of increasing the thickness of the element. At a thickness of 50 microns the hysteresis loop is sheared considerably. For application other than memory it may be possible to tolerate this shearing effect and thereby take advantage of the exceedingly fast switching characteristics of the element.

FIGURE 2 illustrates the switching characteristics of the element of the present invention, in particular, curve A is presented to show the switching characteristics of body 103. Curve B shows the effect of reducing the thickness of toroids, in particular a toroid of composition represented by body 103 and having a thickness of 18 microns. Curve C shows the switching characteristics of thick toroids (500 microns) of the same 103 compositions. The switching speeds of the latter are of the order of 5 times slower than the elements of the present invention..

Another characteristic of the open flux path ferrite element whose geometrical shapes are illustrated in FIGURE 1*a–e* is that they exhibit a uniaxial shape anisotropy in the plane of the element with this property these elements may be utilized in place of thin metallic films in thin film memory arrays. Such circuits are better than the circuits using metal films in that the output voltage responses are much sharper and the disturbed sensitivity reduced as compared to thin metal film circuits.

What has been described herein is a unique, high-speed, ferrite memory element particularly suited for operation as a memory component in computer circuitry. While we have described our invention with particular reference to open flux path elements, thin toroidally shaped ferrites have also been shown to exhibit the same properties.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of preparing a high speed, ferrite memory element having a thickness less than 25 microns which comprises mixing selected metallic oxides in predetermined ratios, calcining the mixture in air at elevated temperatures to form the spinel structure, mixing a resinous binder and a suitable solvent therewith, said oxides touching each other but not agglomerate in said binder and solvent applying the mixture to a support surface to form thereby said element within said thickness drying, cutting into desired shapes, removing said support, and firing at elevated temperatures.

2. A method of preparing a high speed, open flux path, substantially rectangular hysteresis loop, ferrite memory element having a thickness less than 25 microns which comprises mixing selected metallic oxides in predetermined ratios, calcining the mixture in air at 800–1400° C. to form the spinel structure, repulverizing the mass with a resinous binder comprising between 5 and 50% by weight of the spinel powder and a solvent for said binder comprising between ½ to 4 times the weight of all dry materials, including said binder and said spinel powders, remixing the mass for 2 to 10 hours, applying the mixture to a support surface to form thereby said element within said thickness drying, cutting the resultant film into desired shapes, separating the shapes from the support surface, transferring the shapes to an alumina-lined platinum boat and sintering the parts at 1000°–1500° C. for 5 minutes to 3 hours.

3. A method of forming a high speed, open flux path ferrite memory element which comprises the steps of mixing 32.2 grams of magnesium oxide, 38.7 grams of manganese sesquioxide and 135.7 grams of ferric oxide, corresponding to formula $Mg_{.8}Mn_{.5}Fe_{1.7}O_4$, wet ball milling the mixture for 10 hours, oven drying at 110° for two hours, calcining in air at 1000° for three hours, repulverizing the mass to a fine powder, mixing 40 grams of pyroxylin and 500 grams of amyl acetate therewith, ball milling for four hours, pouring onto a glass surface covered with a thin layer of gelatin, placing on a spinning table, spin drying, cutting the resultant thin sheet of ferrite into bars having a length of 0.75 inch, a width of 0.12 inch and a thickness of 0.0004 inch (9 microns), separating the bar ferrite elements from the support surface by dissolving out the gelatin with warm water, placing the individual elements in a platinum boat lined with alumina, sintering at 1400° C. for five minutes and slowly cooling to room temperature.

References Cited in the file of this patent

UNITED STATES PATENTS

| | | |
|---|---|---|
| 2,770,523 | Toole | Nov. 13, 1956 |
| 2,842,500 | Gibson et al. | July 8, 1958 |
| 2,961,709 | Eichbaum et al. | Nov. 29, 1960 |
| 2,978,414 | Harz et al. | Apr. 4, 1961 |

FOREIGN PATENTS

| | | |
|---|---|---|
| 556,756 | Canada | Apr. 29, 1958 |
| 697,219 | Great Britain | Sept. 16, 1953 |
| 737,284 | Great Britain | Sept. 21, 1955 |
| 788,727 | Great Britain | Jan. 8, 1958 |
| 789,099 | Great Britain | Jan. 15, 1958 |